(12) United States Patent
Michot

(10) Patent No.: US 11,674,623 B2
(45) Date of Patent: Jun. 13, 2023

(54) SWIVEL JOINT WITH ELECTRICAL CONDUCTIVITY GREASE FITTING

(71) Applicant: Knappco, LLC, Hamilton, OH (US)

(72) Inventor: Luc Michot, Bergen (NL)

(73) Assignee: KNAPPCO, LLC, Hamilton, OH (US)

( * ) Notice: Subject to any disclaimer, the term of this patent is extended or adjusted under 35 U.S.C. 154(b) by 871 days.

(21) Appl. No.: 16/557,653

(22) Filed: Aug. 30, 2019

(65) Prior Publication Data

US 2019/0383430 A1 Dec. 19, 2019

Related U.S. Application Data

(63) Continuation of application No. 15/466,629, filed on Mar. 22, 2017, now Pat. No. 10,436,363.

(Continued)

(51) Int. Cl.

| F16L 25/01 | (2006.01) |
|---|---|
| F16L 27/08 | (2006.01) |
| F16N 21/02 | (2006.01) |
| F16C 33/66 | (2006.01) |
| F16C 41/00 | (2006.01) |
| F16K 17/04 | (2006.01) |
| H05F 3/02 | (2006.01) |
| H01R 4/64 | (2006.01) |
| H01R 4/66 | (2006.01) |
| F16C 19/08 | (2006.01) |

(52) U.S. Cl.
CPC .......... *F16L 25/01* (2013.01); *F16C 33/6622* (2013.01); *F16C 41/002* (2013.01); *F16K 17/04* (2013.01); *F16L 27/0828* (2013.01); *F16L 27/0845* (2013.01); *F16N 21/02* (2013.01); *H01R 4/643* (2013.01); *H01R 4/66* (2013.01); *H05F 3/02* (2013.01); *F16C 19/08* (2013.01)

(58) Field of Classification Search
CPC ... F16L 25/01; F16L 27/0828; F16L 27/0845; F16L 27/0832; F16K 17/04; F16C 19/08; F16C 33/6622; F16C 41/002; F16C 33/6603; F16C 33/6607; F16C 33/102; F16C 33/103; F16N 21/02; F16N 37/003; H01R 4/643; H01R 4/66; H05F 3/02
See application file for complete search history.

(56) References Cited

U.S. PATENT DOCUMENTS

| 1,307,889 A | 6/1919 | Winholt |
| 2,396,123 A | 3/1946 | Phillips |

(Continued)

OTHER PUBLICATIONS

International Search Report for application No. PCT/US17/23782 dated Jul. 20, 2017.

*Primary Examiner* — Marina A Tietjen
(74) *Attorney, Agent, or Firm* — Workman Nydegger

(57) ABSTRACT

A swivel joint includes a tail section and a body portion that define a passageway therethrough and which can rotate relative to one another. One or more seals and bearings can be disposed between the tail section and the body portion. An electrical conductivity grease fitting can be mounted within a bore hole in the body portion. The electrical conductivity grease fitting can have a lubricant passed therethrough to lubricate the bearings. The electrical conductivity grease fitting has a first portion in electrical communication with the body portion and a second portion that is biased into electrical communication with the tail section to maintain electrical conductivity between the tail section and the body portion.

20 Claims, 7 Drawing Sheets

Related U.S. Application Data

(60) Provisional application No. 62/313,509, filed on Mar. 25, 2016.

(56) References Cited

U.S. PATENT DOCUMENTS

| | | |
|---|---|---|
| 2,412,287 A | 12/1946 | Phillips |
| 2,459,981 A | 1/1949 | Warren |
| 2,497,758 A | 2/1950 | Thomas |
| 2,906,548 A | 9/1959 | Faccou |
| 3,456,964 A | 7/1969 | Zierden |
| 4,351,414 A | 9/1982 | Merten |
| 4,396,212 A | 8/1983 | Honke |
| 4,693,500 A | 9/1987 | Anderson |
| 4,903,941 A | 2/1990 | Nuytten |
| 5,209,526 A | 5/1993 | Beccia et al. |
| 5,259,671 A | 11/1993 | Lowe et al. |
| 5,400,871 A | 3/1995 | Von et al. |
| 5,407,173 A | 4/1995 | Smith |
| 5,908,060 A | 6/1999 | Fargeot |
| 6,142,673 A | 11/2000 | Kottritsch et al. |
| 6,164,707 A | 12/2000 | Ungchusri et al. |
| 6,271,761 B1 | 8/2001 | Smith et al. |
| 6,383,000 B1 | 5/2002 | Burd et al. |
| 6,517,356 B1 | 2/2003 | Smith |
| 6,595,555 B2 | 7/2003 | Ungchusri et al. |
| 8,240,634 B2 | 8/2012 | Jarchau et al. |
| 10,436,363 B2 | 10/2019 | Michot |
| 2002/0163185 A1 | 11/2002 | Bornhorst |
| 2009/0008934 A1 | 1/2009 | Matzner et al. |
| 2011/0042936 A1 | 2/2011 | Andrews |
| 2012/0061185 A1 | 3/2012 | Brehmer et al. |
| 2013/0273484 A1 | 10/2013 | Lefebvre et al. |
| 2016/0153596 A1 | 6/2016 | Ungchusri et al. |
| 2017/0276274 A1 | 9/2017 | Michot |

SWIVEL JOINT WITH ELECTRICAL CONDUCTIVITY GREASE FITTING

This application is a continuation of U.S. application Ser. No. 15/466,629, filed Mar. 22, 2017, and entitled SWIVEL JOINT WITH ELECTRICAL CONDUCTIVITY GREASE FITTING, which claims priority to and the benefit of U.S. Provisional Application No. 62/313,509, filed Mar. 25, 2016, and entitled SWIVEL JOINT WITH ELECTRICAL CONDUCTIVITY GREASE FITTING, the entire content of each of which is incorporated herein by reference.

BACKGROUND

Technical Field

Exemplary embodiments of the present disclosure relate to swivel joints, and more specifically, to electrical conductivity grease fittings for establishing and maintaining electrical conductivity in a swivel joint and lubricating moving parts thereof.

The Relevant Technology

Loading or unloading arms are used to assist in the transfer of various materials, wet or dry, from a supply source to a container, tanker car or truck in which materials are transported or shipped, or a vehicle, such as an airplane. Often, loading arms can be quite heavy and can be of considerable length. Swivel joints generally include a mechanism, such as a bearing assembly, to make it easier to move the loading arm, and align it with the relatively small opening of a container. To maintain the proper functioning of the bearing assembly, swivel joints often include a grease fitting that allows for lubricant to be applied to the bearing assembly.

During the loading of various materials, static electricity may be generated. The voltage potential created causes the excited electrons to seek an area of lower voltage potential. Surrounding metal, such as the loading arm, the container, or both can provide a low resistance to electrons and thus, may attract the electrons. Such static electricity should be dissipated preferably by routing or directing it to the ground, to the loading rack, or both.

Swivel joints, however, do not necessarily dissipate static electricity. In some instances, they do not have a tight or constant metal-to-metal contact because they are configured to permit relative rotational movement of the components to position the loading arm, as desired. Grease, oil and other lubricants often fill the cavity between the adjacent components further inhibiting metal-to-metal contact. Effective breaks in the metal-to-metal contact for periods of time may electrically isolate adjacent components, thereby hindering the dissipation of static electricity.

In some cases, the material being routed through a loading arm may offer a path of less electrical resistance that the electrical conductivity offered by the adjacent metal components of the swivel joint (e.g., the tail and body sections). Such a situation could result in an undesirable consequence, and/or serious injury, especially if the material being routed through the loading arm is volatile, such as gasoline, chemicals, and the like.

BRIEF SUMMARY

Exemplary embodiments of the present disclosure relate to swivel joints and mechanisms for lubricating and maintaining electrical conductivity between components thereof. For example, in one embodiment, a swivel joint includes a tail section and a body portion. The tail section has an interior that defines at least a portion of a passageway through the swivel joint. Similarly, the body portion has an interior that defines at least a portion of the passageway through the swivel joint. The interior of the body portion is adapted to receive at least a portion of the tail section therein. The body portion also include a bore hole therethrough. One or more seals are disposed between an interior surface of the body portion and an outer surface of the tail section. The one or more seals, the interior surface of the body portion, and the outer surface of the tail section cooperate to at least partially define a cavity. An electrical conductivity grease fitting is mounted in the bore hole of the body portion. The electrical conductivity grease fitting is adapted to have a lubricant passed therethrough and into the cavity. Additionally, the electrical conductivity grease fitting has a first portion in electrical communication with the body portion and a second portion in electrical communication with the tail section to maintain electrical conductivity between the tail section and the body portion.

In another embodiment, an electrical conductivity grease fitting can be used in lubricating and maintaining electrical conductivity between components of a joint. The electrical conductivity grease fitting can include a body having a passageway therethrough and a plunger disposed partially within the passageway in the body. The plunger can include a passageway and one or more outlets that are in fluid communication with the passageway in the body. A biasing member can biases the plunger to an extended position, such that a distal end of the plunger extends out of the body. A grease nipple can be in fluid communication with the passageways in the body and the plunger and with the one or more outlets to enable a lubricant to be injected therethrough.

In still another embodiment, a relief valve assembly includes a body, a plunger, a biasing member, and a relieve valve. The body has a passageway therethrough and the plunger is disposed partially within the passageway. The plunger includes a passageway and one or more inlets that are in fluid communication with the passageway in the body. The biasing member biases the plunger to an extended position, such that a distal end of the plunger extends out of the body. The relief valve is in fluid communication with the passageways in the body and the plunger and with the one or more inlets.

These and other objects and features of the present disclosure will become more fully apparent from the following description and appended claims, or may be learned by the practice of the disclosed embodiments as set forth hereinafter.

BRIEF DESCRIPTION OF THE DRAWINGS

To further clarify the above and other advantages and features of the present disclosure, a more particular description will be rendered by reference to specific embodiments thereof which are illustrated in the appended drawings. It is appreciated that these drawings depict only typical embodiments and are therefore not to be considered limiting of its scope, nor are the drawings necessarily drawn to scale. The disclosure will be described and explained with additional specificity and detail through the use of the accompanying drawings in which.

DETAILED DESCRIPTION

Reference will now be made to the drawings to describe various aspects of exemplary embodiments of the disclosure. It is understood that the drawings are diagrammatic and schematic representations of such exemplary embodiments, and are not limiting of the present disclosure, nor are they necessarily drawn to scale. No inference should therefore be drawn from the drawings as to the dimensions of any embodiment or element. In the following description, numerous specific details are set forth in order to provide a thorough understanding of the present disclosure. It will be obvious, however, to one of ordinary skill in the art that the present disclosure may be practiced without these specific details.

Figure 1:
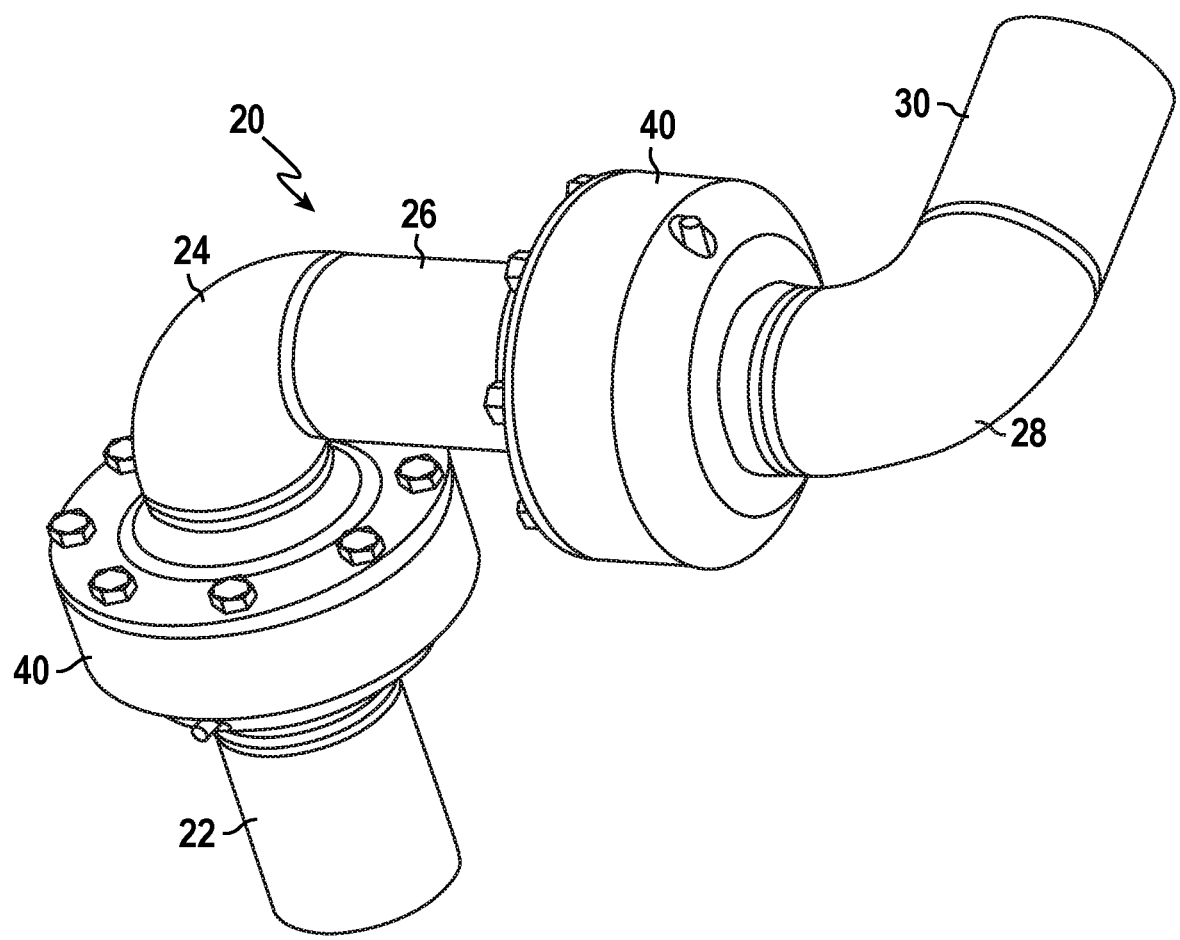
FIG. 1 illustrates a loading arm assembly according to an exemplary embodiment of the disclosure.

FIG. 1 illustrates an exemplary loading conduit 20, which might be used, for example, in the petroleum or chemical industry for the transfer of wet or dry materials from a storage supply to a container or tank, or the like. As will be appreciated by those skilled in the industry, an overhead supply system or loading conduit, such as exemplified in the FIG. 1 and discussed herein, can be used in any other of a variety of other industries as well for the transfer of materials or fluids.

In the illustrated embodiment, the loading conduit 20 includes a vertical pipe 22 connected in fluid communication with a horizontal pipe 26 by an elbow joint 24. Similarly, the horizontal pipe 26 is connected in fluid communication to a swing or loading arm 30 by another elbow joint 28. The loading conduit 20 also includes a swivel joint 40 connected between the horizontal pipe 26 and the elbow joint 28 and a swivel joint 40 connected between the vertical pipe 22 and the elbow joint 24. The swivel joints 40 allow material to flow therethrough such that the vertical pipe 22, the elbow joint 24, the horizontal pipe 26, the elbow joint 28, and the loading arm 30 are in fluid communication with one another via the swivel joints 40. The swivel joints 40 also allows for relative rotation between the pipes 22, 26 and the loading arm 30.

It should be noted that while the various pipes of the loading conduit 20 are illustrated or referred to as being in a certain orientation or having certain characteristics, such is merely exemplary. For instance, although vertical pipe 22 is illustrated as a riser pipe, in other embodiments the vertical pipe 22 could be a "downcomer" pipe, or could be oriented in essentially any attitude. Similarly, the horizontal pipe 26 may be oriented in a different direction. Furthermore, the loading conduit 20 may include fewer or more pipes, elbow joints, and/or swivel joints.

Although not illustrated, the loading arm 30 can be pivotally connected to and placed in fluid communication with a spout member or drop pipe which remains in essentially a vertical position during manipulation (e.g., raising or lowering) of the loading arm 30 to assist in filling a container, storage tank, or the like. The spout member can be optionally equipped with a manipulation control or faucet valve, by which flow of material or fluid can be controlled. Also, the spout member may be configured to be detachably coupled to the opening of the container, such as a fuel tank for an airplane.

Figure 2:
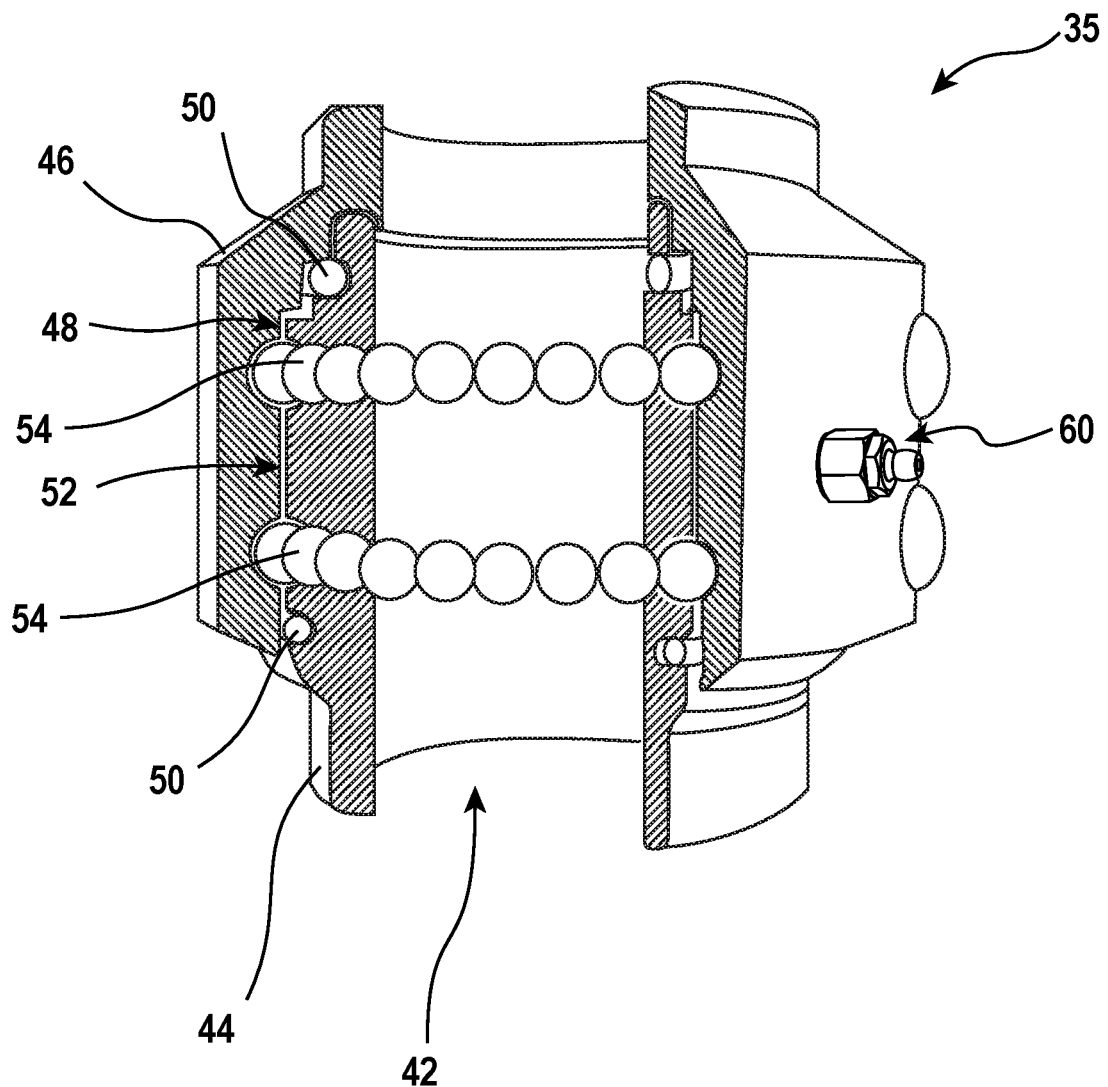
FIG. 2 illustrates a cut-away view of a swivel joint according to one embodiment of the disclosure.

Attention is now directed to FIG. 2, which illustrates a cutaway view of a swivel joint 35, which may be similar or identical to swivel joints 40. In the illustrated embodiment, the swivel joint 35 includes a tail section 44 and a body portion 46 that are connected such that they are rotatable relative to each other. The tail section 44 and body portion 46 cooperate to define a fluid passage 42 that extends therethrough. A portion of tail section 44 is insertable into a cavity section 48 of the body portion 46. Furthermore, the tail section 44 and the body portion 46 are preferably formed so that they can withstand corrosion from materials being routed through the fluid passage 42, and have sufficient toughness and durability to withstand industrial uses, often in varied and extreme climate conditions.

Interposed between the tail section 44 and the body portion 46 are seals 50. Although the illustrated embodiment includes two seals 50, fewer or more seals may be used in other embodiments. The seals 50 can be any suitable O-ring or spring energized seal. Additionally, one or more grooves or recesses may be provided on either the outer surface of the tail section 44, the inner surface of body portion 46, or both, so that the seals 50 can be positioned therein to hold them in place. The seals 50 can limit or prevent external contamination from entering the swivel joint 35 between the tail section 44 and the body portion 46. Likewise, the seals 50 can contain the material that is being passed through the passage 42, thereby limiting or preventing the escape of the material from the swivel joint 35 between the tail section 44 and the body portion 46.

The seals 50, the external surface of the tail section 44 between the seals 50, and the internal surface of the body portion 46 between the seals 50 define a cavity 52. Disposed within the cavity 52 are bearings 54. The bearings 54 facilitate the relative rotational movement between the tail section 44 and the body portion 46. In some embodiments, one or more grooves or recesses may be provided on either the outer surface of the tail section 44, the inner surface of body portion 46, or both, through which the bearings 54 can roll. While FIG. 2 illustrates two rows of bearing 54, other embodiments may include a single row or more than two rows of bearings 54.

In addition to preventing leaks and ingress of contaminates, the seals 50 can also help protect the bearings 54. For instance, the seals 50 can assist in maintaining a lubricant (e.g., grease, oil) disposed within the cavity 52. Over time, the lubricant may need to be replaced or replenished. Accordingly, as illustrated in FIG. 2, the swivel joint 35 may include a grease fitting 60 to permit selective filling or refilling of the cavity 52 with a lubricant. Although only a single grease fitting 60 is illustrated, the swivel joint 35 may include multiple grease fittings 60. Additionally, the grease fitting 60 is merely exemplary. For instance, rather than being disposed between the two rows of bearings 54, the grease fitting 60 may be disposed between one of the seals 50 and one of the rows of bearings 54.

Although not shown in FIG. 2, the swivel joint 35 may also be provided with one or more relief valve assemblies to assist in preventing pressure build-up in the cavity 52. The relief valve assembly(ies) may assist in allowing air, and excess lubricant to escape from the cavity 52 as it is being filled so that it is not overfilled.

Figure 3:
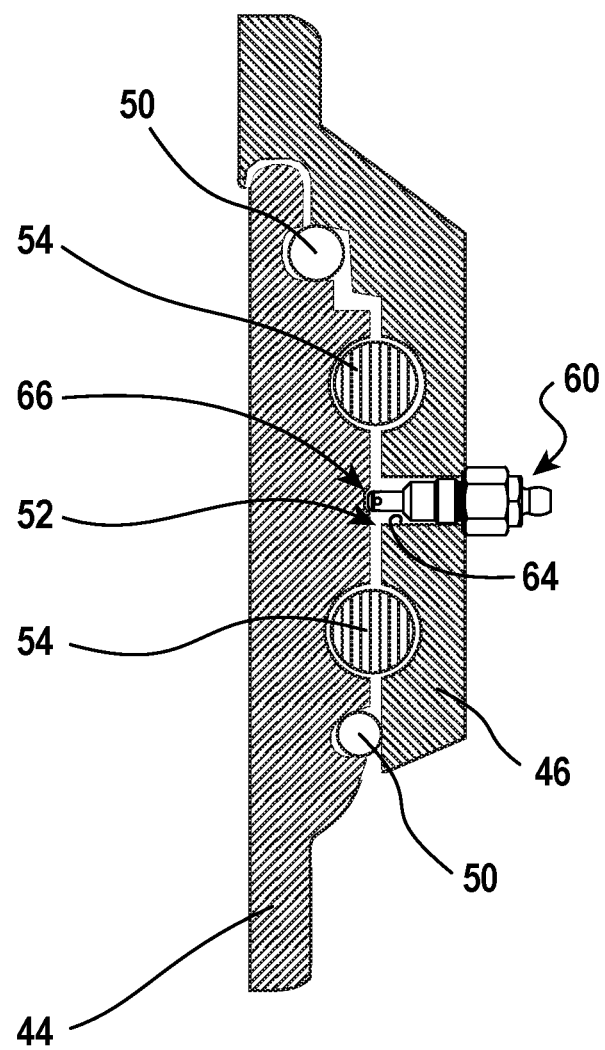
FIG. 3 illustrates a cross-sectional view of a portion of the swivel joint of FIG. 2.

FIG. 3 illustrates a cross-section view of a portion of the swivel joint 35 illustrating the grease fitting 60 in more detail. As discussed in greater detail below, the grease fitting 60 can be used as a means or mechanism for injecting a lubricant into the cavity 52. As also discussed in greater detail below, the grease fitting 60 can maintain electrical conductivity between the tail section 44 and the body portion 46. Accordingly, the grease fitting 60 may also be referred to as an electrical conductivity mechanism 60 or an electrical conductivity grease fitting 60.

In the embodiment illustrated in FIG. 3, the grease fitting 60 is insertable into a bore hole 64 through the wall of the body portion 46. In some embodiments, an outer surface of the grease fitting 60 and an inner surface of the bore hole 64 can have mating threads that can secure the grease fitting 60 in the bore hole 64. In other embodiments, the grease fitting 60 can be secured within the bore hole 64 with other securing mechanisms, such as a friction fit, adhesive, clamp, and the like.

With the grease fitting 60 positioned in the bore hole 64, an end of the grease fitting 60 is disposed in the cavity 52 and in contact with the tail section 44. As discussed in greater detail below, the end of the grease fitting 60 that is disposed in the cavity 52 can include one or more openings or outlets to facilitate delivery of lubricant to the cavity 52. The end of the grease fitting 60 can also maintain contact with the tail section 44 in order to maintain electrical conductivity between the tail section 44 and the body portion 46.

The outer surface of the tail section 44 may include a groove or channel 66. The groove or channel 66 may be sized to receive therein at least a portion of the end of the grease fitting 60 to help maintain or seat the end of the grease fitting 60 therein as the swivel joint 35 rotates. The end of the grease fitting 60 and the groove or channel 66 may have corresponding geometries to enhance the effective electrical communications or conductivity.

Figure 4A:
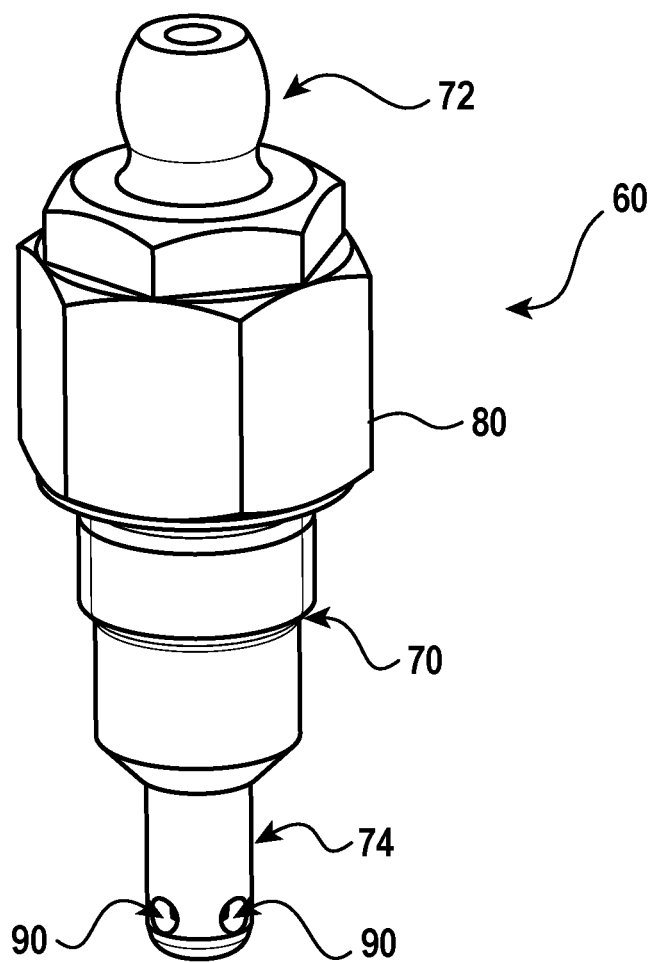
FIGS. 4A-4D illustrate perspective, side elevation, side partial cross-sectional, and end views of an electrical conductivity grease fitting according to an exemplary embodiment of the disclosure.
Figure 4B:
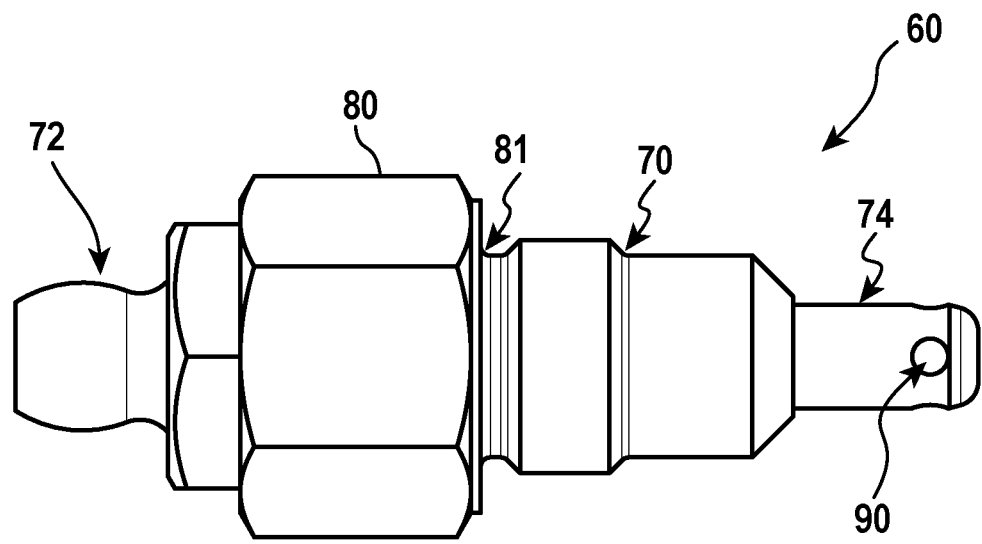
Figure 4C:
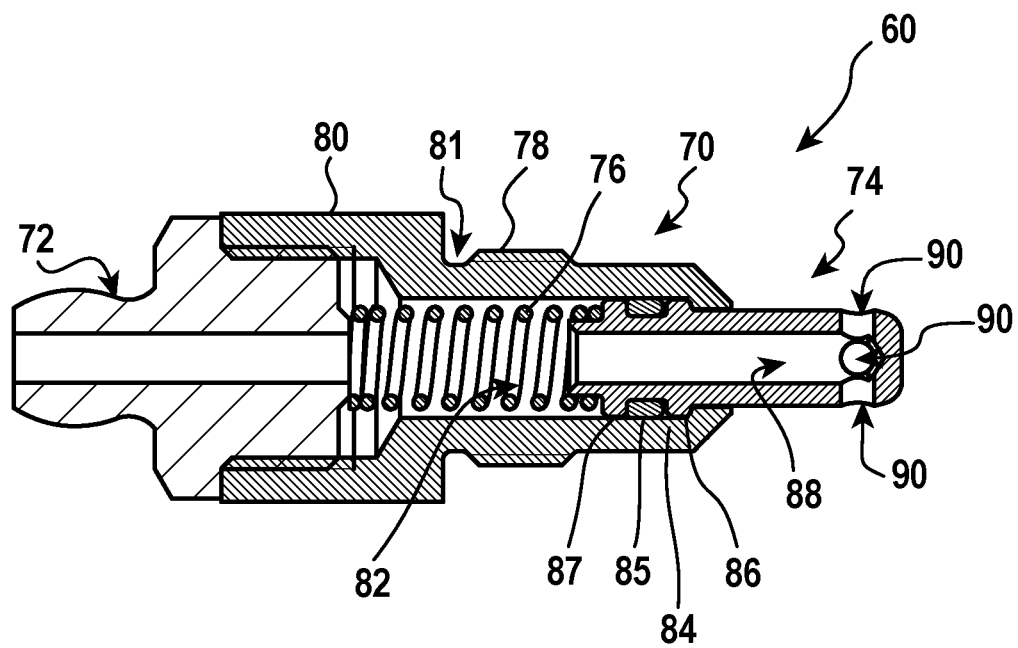
Figure 4D:
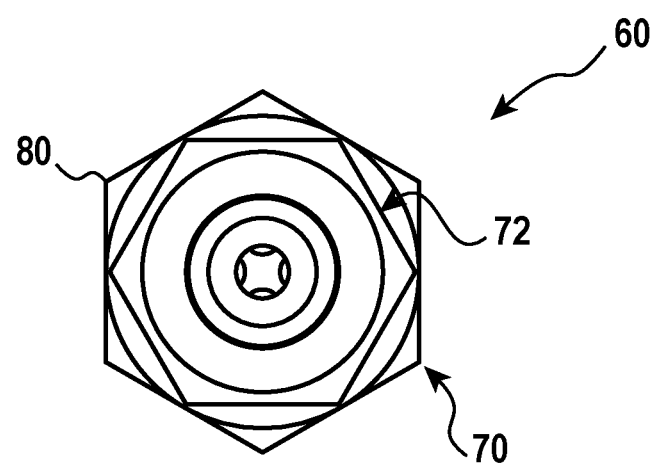

Attention is now directed to FIGS. 4A-4D, which illustrate the electrical conductivity grease fitting 60 is greater detail. More specifically, FIG. 4A illustrates a perspective view of the grease fitting 60, while FIGS. 4B-4D illustrate side elevation, side cross-sectional, and end views thereof. The grease fitting 60 includes a body 70, a grease nipple 72 disposed at a first end of the body 70, a plunger 74 extendable from a second end of the body 70, and a biasing member 76 disposed within the body 70.

At least a portion of the outer surface of the body 70 can have threads 78 to enable the grease fitting 60 to be threadably secured within the bore hole 64 (FIG. 3). Similarly, at least a portion of the body 70 can include an outer profile, such as a hex head 80, which can facilitate placement of the grease fitting 60 in the bore hole 64. In the illustrated embodiment, the hex head 80 is disposed at a first end of the body 70 adjacent to the grease nipple 72. The body can also include one or more channels or grooves 81 in the outer surface for receiving one or more seals, such as O-rings, that create a seal between the outer surface of the body 70 and the bore hole 64. Furthermore, the body 70 includes a passageway 82 extending therethrough. The passageway 82 can enable transfer of lubricant from the grease nipple 72 to the cavity 52 (FIGS. 2-3).

The grease nipple 72 can enable lubricant to be injected therethrough and into the body 70. In some embodiments, the grease nipple 72 can limit or prevent lubricant from leaking out of the body 70. For instance, the grease nipple 72 may include a valve, such as a one-way valve, that allows for lubricant to be injected into the grease fitting 60 while limiting or preventing lubricant from exiting the grease fitting 60 through the grease nipple 72. In other embodiments, the grease nipple 72 acts as a cap or plug on the end of the body 70 and can be selectively removed to enable lubricant to be injected into the body 70. After the lubricant is added, the grease nipple 72 can be replaced on the end of the body 70 to prevent leakage of the lubricant.

As best illustrated in FIG. 4C, the plunger 74 is disposed at least partially within the passageway 82 in the body 70 and extends at least partially from the second end of the body 70. The plunger 74 is movably disposed within the body 70 such that different lengths of the plunger 74 can extend from the second end of the body 70. The outer surface of the plunger 74 and the inner surface of the body 70 can include corresponding stops 84, 86 that can limit the extent to which the plunger 74 can extend from the body 70.

The plunger 74 includes an internal passageway 88 and one or more outlets 90 that are in fluid communication with one another. The passageway 88 is in fluid communication with the passageway 82 in the body 70 such that lubricant injected through the grease nipple 72 passes through the passageways 82, 88 and out of the plunger 74 through the outlets 90. In the illustrated embodiment, there are four outlets 90 that are spaced about the plunger 74 and offset from one another by 90°. In other embodiments, there can be less or more than four outlets. Additionally, the outlets can be offset from one another by different degrees.

In the illustrated embodiment, the outlets 90 are oriented radially such that they are disposed in the side walls of the plunger 74. Such an arrangement of outlets can facilitate injection of lubricant in a desired direction or multiple directions in the cavity 52. For instance, referring back to FIG. 3, the outlets 90 may be oriented to direct lubricant towards both rows of bearings and/or throughout the cavity 52.

The biasing member 76 (FIG. 4C) may be disposed within the body 70 such that it biases or urges the plunger 74 towards a position in which more of the plunger 74 extends out of the body 70. In the illustrated embodiment, the biasing member 76 is a coil spring. A first end of the spring is positioned against a ridge or ledge in the passageway 82 while a second end of the spring is positioned against the plunger 74. Even more specifically, the second end of the spring is disposed about a portion of the plunger 74 and against a shoulder 87. The spring is at least partially compressed between the ridge and the shoulder 87. The compression of the spring biases or urges the plunger 74 to a more extended position.

The biasing (via the biasing member 76) of the plunger 74 to the extended position helps maintain electrical conductivity between the tail section 44 and the body portion 46 of the swivel joint 35. For instance, when the grease fitting 60 is positioned in the bore hole 64, as shown in FIG. 3, the biasing member 76 biases the plunger 74 to an extended position relative to the body 70 so that the distal end of the plunger 74 contacts the outer surface of the tail section 44. The continuous biasing of the plunger 74 maintains the contact between the plunger 74 and the tail section 44. Because the plunger 74 and the body 70 are formed of electrically conductive materials, the contact between the plunger 74 and the tail section 44 and between the body 70 and the body portion 46 maintains electrical communication or conductivity between the tail section 44 and the body portion 46.

To further ensure or maintain the electrical communication or conductive path, the grease fitting 60 can also include a conductive ring (e.g., O-ring, D-ring, etc.) 85 disposed between and in contact with the plunger 74 and the body 70. The conductive ring 85 can maintain electrical communication or conductivity between the plunger 74 and the body 70. Thus, even if the plunger 74 and the body 70 are not in direct electrical communication with one another, the conductive ring 85 can ensure that there is an electrical path between the plunger 74 and the body 70, and thus between the tail section 44 and the body portion 46.

As also illustrated in FIG. 4C, the conductive ring 85 may be disposed on the outside of the plunger 74 between the stop 84 and the shoulder 87. The stop 84 and the shoulder 87 may cooperate to retain the conductive ring 85 on the plunger 74. Thus, even if the plunger 74 moves relative to the body 74, the conductive ring 85 will be retained on the plunger 74 and in contact with both the plunger 74 and the body 70.

Figure 5A:
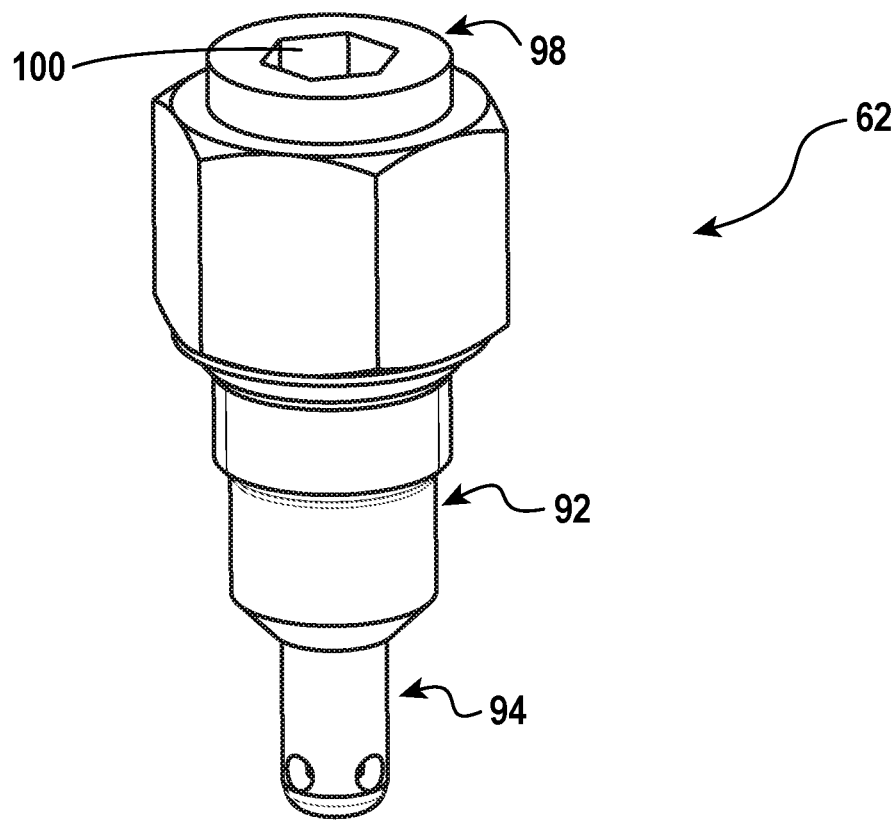
FIGS. 5A-5D illustrate perspective, side elevation, side partial cross-sectional, and end views of an electrical conductivity relief valve assembly according to an exemplary embodiment of the disclosure.
Figure 5B:
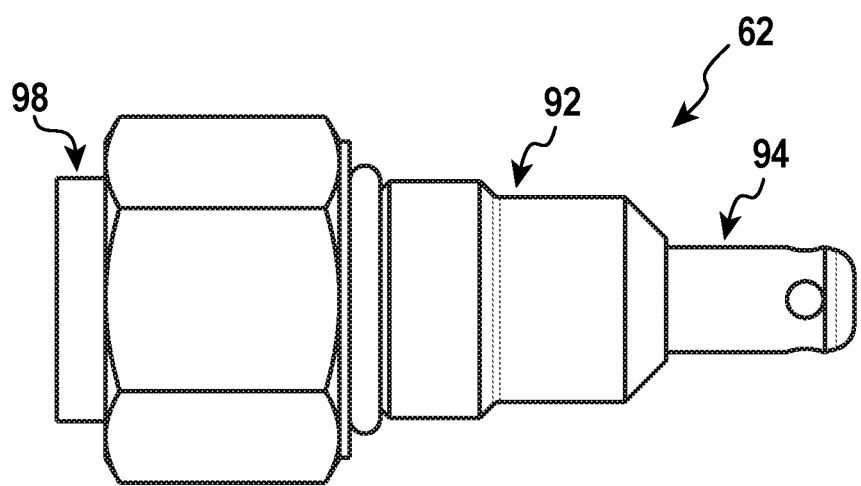
Figure 5C:
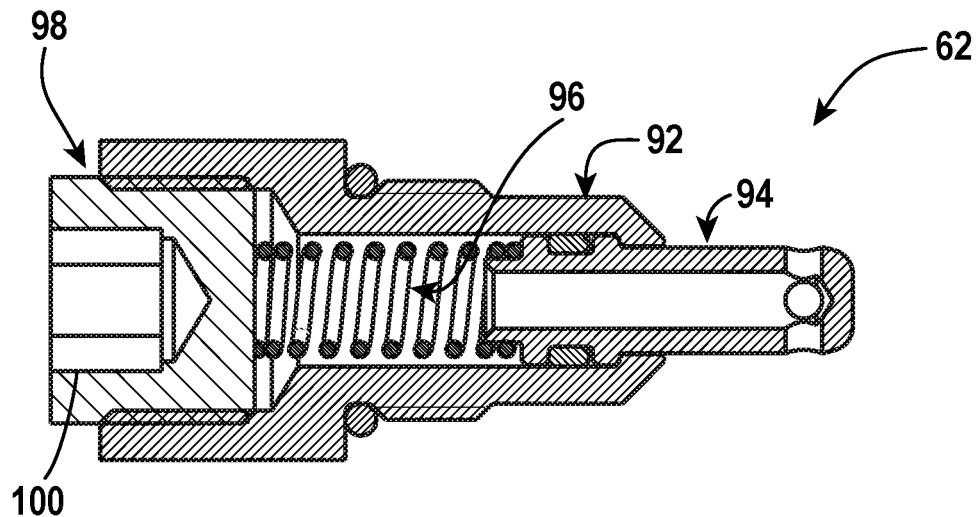
Figure 5D:
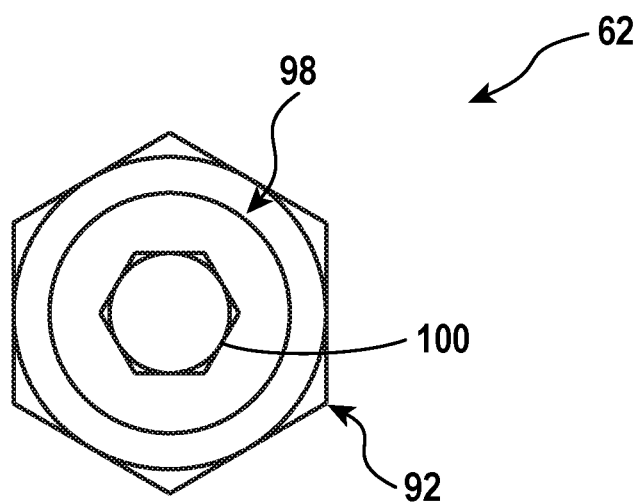

Attention is now directed to FIGS. 5A-5D, which illustrate an electrical conductivity relief valve assembly 62. More specifically, FIG. 5A illustrates a perspective view of the relief valve assembly 62, while FIGS. 5B-5D illustrate side elevation, side cross-sectional, and end views thereof. The relief valve assembly 62 can be mounted within a bore hole (similar to bore hole 64) in the body portion 46.

In the illustrated embodiment, the relief valve assembly 62 is similar or identical to the grease fitting 60 in many respects. The relief valve assembly 62 includes a body 92, a plunger 94, a biasing member 96, a conductive ring 95 and a shoulder 97 that can be substantially similar or identical to the body 70, plunger 74, biasing member 76, conductive ring 85, and shoulder 87 of the grease fitting 60. Accordingly, the following discussion will focus primarily on the differences therebetween. Nevertheless, the similarities allow the relief valve assembly 62 to help maintain electrical conductivity between the tail section 44 and the body portion 46 in a manner similar to the grease fitting 60.

Rather than having a grease nipple, however, the relief valve assembly 62 includes a relief valve 98. The relief valve 98 is disposed at the first end of the body 92 so that it is positioned adjacent to or at least partially outside of the outer surface of the body portion 46. The relief valve 98 can assist in preventing pressure build-up in the cavity 52. Additionally, the relief valve 98 can assist in allowing air and excess lubricant to escape from the cavity 52 as the cavity 52 is being filled so that the cavity 52 is not overfilled. For instance, as a lubricant is being introduced into the cavity 52 via the grease fitting 60, air and excess lubricant can enter the relief valve assembly 62 (via one or more inlets, similar or identical to the outlets 90). The air or excess lubricant can pass from the inlet(s), through the passageways in the plunger 94 and body 92, and out of the assembly 62 via the relief valve 98.

The relief valve 98 may be selectively adjustable to alter the amount of fluid or air that can pass therethrough. For instance, in the illustrated embodiment, the relief valve 98 includes an outer profile in the form of a hex interface 100 that allows the relief valve 98 to be adjusted relative to the body 92 in order to adjust the flow through the relief valve 98.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electrical conductivity grease fitting for use in lubricating and maintaining electrical conductivity between components of a joint, the electrical conductivity grease fitting comprising:
    a body assembly having a first portion, a second portion, a passageway therethrough;
    a valve configured to be associated with the first portion of the body assembly and have a lubricant passed therethrough, the valve being in fluid communication with the passageway in the body assembly; and
    one or more openings disposed radially about the second portion of the body assembly, the one or more openings being in fluid communication with the passageway in the body assembly and the valve.

2. An electrical conductivity grease fitting as recited in claim 1, wherein the first portion of the body assembly is adapted to be mountable within a bore hole in a joint component.

3. An electrical conductivity grease fitting as recited in claim 1, wherein an outer surface of the first portion of the body assembly comprises threads.

4. An electrical conductivity grease fitting as recited in claim 1, wherein the one or more openings open radially relative to an axis of the second portion of the body assembly.

5. An electrical conductivity grease fitting as recited in claim 1, wherein the valve is selectively removable from the body assembly.

6. An electrical conductivity grease fitting as recited in claim 1, wherein the first portion of the body assembly comprises a body and the second portion of the body assembly comprises a plunger.

7. An electrical conductivity grease fitting as recited in claim 6, wherein a first portion of the plunger is disposed at least partially within the body and a second portion of the plunger is disposed at least partially outside of the body.

8. An electrical conductivity grease fitting as recited in claim 7, wherein the one or more openings are disposed outside of the body.

9. An electrical conductivity grease fitting as recited in claim 7, further comprising a biasing member that biases the plunger to an extended position, such that a distal end of the plunger extends out of the body.

10. An electrical conductivity grease fitting as recited in claim 9, wherein the biasing member comprises a spring compressed between a surface in the body and a surface on the plunger.

11. An electrical conductivity grease fitting as recited in claim 10, wherein the valve is configured to either (i) allow for the injection of a lubricant into the grease fitting or (ii) allow for the lubricant to exit the grease fitting therethrough.

12. An electrical conductivity grease fitting as recited in claim 9, wherein the body and the plunger comprises cooperating stops to limit the extension of the plunger from the body.

13. An electrical conductivity grease fitting, comprising:
    a body assembly having a first portion, a second portion, a passageway therethrough;
    one or more openings disposed radially about a longitudinal axis of the second portion of the body assembly, the one or more openings being in fluid communication with the passageway in the body assembly; and a valve configured to be associated with the first portion of the body assembly and in fluid communication with the passageway in the body assembly and the one or more openings.

14. An electrical conductivity grease fitting as recited in claim 13, wherein the valve is selectively adjustable to alter an amount of fluid or air that can pass therethrough.

15. An electrical conductivity grease fitting as recited in claim 13, wherein the first portion of the body assembly comprises a body and the second portion of the body assembly comprises a plunger that is movably disposed at least partially within the body.

16. An electrical conductivity grease fitting as recited in claim 15, further comprising a biasing member that biases the plunger to an extended position, such that a distal end of the plunger extends out of the body.

17. An electrical conductivity grease fitting as recited in claim 13, wherein the valve comprises a grease nipple configured to have fluid or air injected therein.

18. An electrical conductivity grease fitting as recited in claim 13, wherein the valve is configured to allow fluid or air to exit therethrough.

19. An electrical conductivity grease fitting as recited in claim 13, wherein the first portion of the body assembly comprises external threads thereon.

20. An electrical conductivity grease fitting as recited in claim 13, further comprising a seal disposed between the first portion and the second portion, the seal being configured to prevent fluid or air from passing between the first portion and the second portion.

\* \* \* \* \*